Patented Mar. 14, 1933

1,901,409

UNITED STATES PATENT OFFICE

FRED M. POE, OF SUFFERN, NEW YORK, ASSIGNOR TO THE AMERICAN BRAKE SHOE AND FOUNDRY COMPANY, OF NEW YORK, N. Y., A CORPORATION OF DELAWARE

COATING MATERIAL FOR CASTING MOLDS

No Drawing.  Application filed May 4, 1932.  Serial No. 609,283.

This invention relates to coating materials for casting molds and its object is to provide an efficient coating which can be easily applied to the walls of a mold cavity to prevent the casting from sticking to the walls and to reduce the flow of heat from the casting into the walls.

I have found the invention especially adapted for repetition molds having the cavity walls lined in whole or in part with refractory material but it can be used to advantage in other molds.

The coating consists of fused silica and graphite each finely ground and mixed in a dry state and subsequently mixed with water for use. I prefer to grind the fused silica and the graphite from 80 to 150 mesh or finer, although either or both of these materials may be coarser if desired. The finer the materials are ground the more evenly and uniformly the coating will spread.

A mixture in the proportion of 60% ground fused silica and 40% ground graphite makes a desirable mixture but these proportions can be varied as conditions may require or make it desirable. It will be understood that increasing the fused silica content will increase the heat insulation property of the coating and, conversely, decreasing the fused silica content will decrease the heat insulation property of the coating. While it may be possible under some conditions to increase the proportion of fused silica beyond 60%, I prefer not to do so because it seems that any such excess of fused silica tends to make it spread unevenly. When it is desired to apply a coating, water is added and the mixture is stirred until thoroughly mixed. The coating may be applied in any suitable manner but I prefer to spray or brush it on the walls of the mold cavity after each casting operation and while the walls are still warm but I have found it satisfactory to spray it on the walls after two or three casting operations. The coating is sprayed or brushed uniformly over the entire wall surface of the mold cavity. I find that fused silica alone cannot be sprayed or applied to a molding surface satisfactorily and with the uniformity and evenness required, due to the specific gravity of the material; but when the fused silica is mixed with graphite, powdered to substantially the same mesh, the coating may be uniformly and evenly applied to the surface of the mold cavity walls. I have also found that fused silica used alone sticks so tightly to the mold cavity walls that it will build up quickly thereon and is hard to remove; but when ground graphite is used with the fused silica, the coating does not adhere so tightly and does not build up so quickly and it can be easily brushed off or otherwise removed to clean the mold cavity walls at intervals. The fused silica is a good heat insulating material and has a low degree of expansion and therefore the coating is particularly good for a refractory lining because it will reduce the heat penetration to the lining and protect the lining against spalling and chipping.

While I prefer to use a mixture not exceeding 60% of ground fused silica and approximately 40% of ground graphite, I do not limit the invention to these exact proportions because it may be desirable to change these proportions for different molds and to satisfy different conditions and I reserve the right to make any changes in my invention which may be within the scope of the following claims.

I claim:

1. A coating for casting molds consisting of a liquid mixture containing ground fused silica and ground graphite.

2. A coating for casting molds consisting of a mixture of fused silica and graphite finely ground and mixed with water.

3. A coating for casting molds consisting of a mixture of fused silica and graphite ground to a fineness of at least 80 mesh and mixed with water.

4. A coating for casting molds consisting of a mixture of substantially 60% ground fused silica and 40% ground graphite and water.

5. A coating for casting molds consisting of a mixture of substantially 60% fused silica and 40% graphite ground to a fineness of at least 80 mesh.

FRED M. POE.